UNITED STATES PATENT OFFICE.

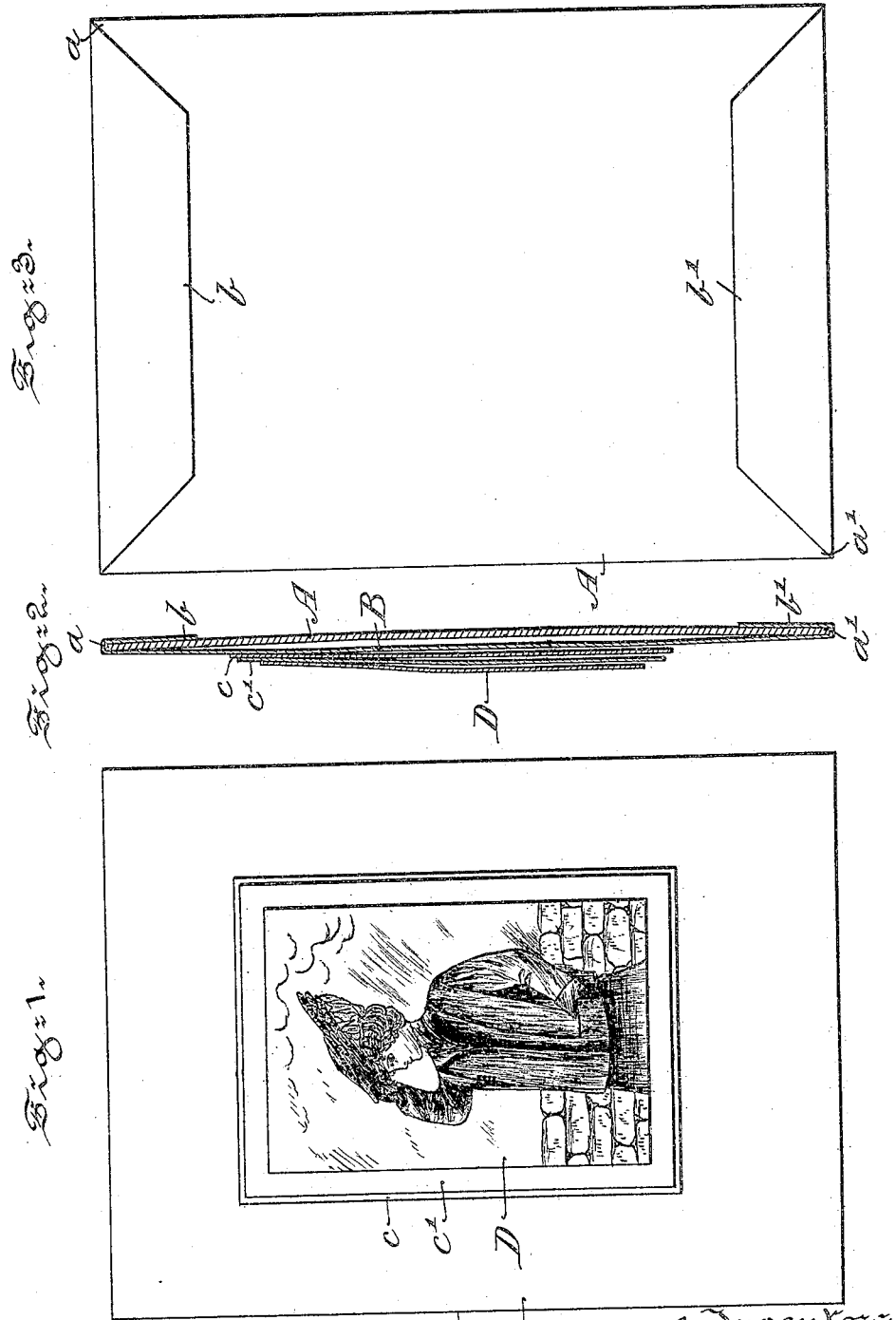

JOSEPH M. ELLIOT, OF GERMANTOWN, PENNSYLVANIA.

MOUNTING PHOTOGRAPHS OR PICTURES.

No. 818,084.     Specification of Letters Patent.     Patented April 17, 1906.

Application filed January 22, 1906. Serial No. 297,151.

*To all whom it may concern:*

Be it known that I, JOSEPH MITCHELL ELLIOT, a citizen of the United States, residing at Germantown, in the county of Philadelphia and State of Pennsylvania, have invented certain new and useful Improvements in Mounting Photographs or Pictures, of which the following is a specification.

My invention relates to certain improvements in the mounting of photographs or pictures whereby the picture or photograph is held therefrom in relief to give the effect of a framed photograph or picture and to add tone thereto from the photographer's art; and in such connection it relates more particularly to the constructive arrangement of the mount and to the manner of securing the photograph or picture thereto to produce the defined effects of the photograph or picture supported therefrom.

The nature and scope of my present invention will be more fully understood from the following description, taken in connection with the accompanying drawings, forming part hereof, in which—

Figure 1 is a front elevation of a mount for photographs or pictures embodying characteristic main features of my present invention. Fig. 2 is a vertical central section of the mount with the picture supported therefrom in a partially-detached condition and representing the normal position of the same in application to such a mount, and Fig. 3 is a rear elevational view showing the manner of securing the mount to the stiff back forming the support for the photograph or picture suspended in a mounted condition from the same.

Referring to the drawings, A represents a stiff back of, preferably, pasteboard, to which is applied a sheet of what is known as "photographic-mount" paper B. This paper mount is held to position to the back A, free of the face thereof, by the upper and lower edges $a$ and $a'$ of the back A and by means of flaps $b$ and $b'$ of the mount B by pasting or otherwise fastening the same to the back, the mount-paper B contacting only with the face of the back A at the top and bottom edges of the said board, while intermediate thereof the mount-paper is free from contact with the back in normal condition for use, which tends to enliven the effect of the same when a photograph or picture is applied thereto—for example, in a manner to be hereinafter more fully explained. Hitherto it has been the custom to paste the mount-paper directly on the face, which has proven more or less of a task to insure a smooth surface being given thereto, while at the same time, due to the pasting, it deadens the appearance of the applied sheet when the photograph is attached thereto, as well as leaves the mount-sheet in a wrinkled form on the back A. The mount-paper B in normal condition for use occupies a position away from the stiff back A—for example, as shown in Fig. 2—to permit of the application of oblong paper or other material inserts $c$ and $c'$ to the same, with portions free from said sheet B, and at the same time affording thereby a more or less angular position of the inserts to the plane of the sheet B thereon by the attaching of the inserts $c$ and $c'$ at preferably the upper portions only of the mount-sheet B. When the outer insert $c'$ is applied in the manner illustrated, for example, in Fig. 2, there is mounted and fastened, by means of glue or paste, at the upper portion of the same a photograph or picture D, whereby is given to the finished picture a frame-like effect—for example, as illustrated in Fig. 1—as well a slight angular position viewed in cross-section in Fig. 2, of the picture or photograph thereto. Thus the mounting of a photograph or picture so as to occupy a position as hereinbefore defined enables the photographer to readily prepare his own mount, either with the inserts, as shown in Fig. 2, as a part thereof or to secure the photograph or picture directly to the mount-sheet B with such finishing touches or effects from an artistic standpoint as may appeal to the operative in finishing the photograph so as to be in a mounted condition as will suit intended fancies of the person.

Having thus described the nature and object of my invention, what I claim as new, and desire to secure by Letters Patent, is—

1. A mount for photographs or pictures, comprising a stiff board back, a sheet of mount-paper or the like stretched over the face and held in a rigid position by securing the same only to the back, and a photograph or picture attached to the sheet so as to be held suspended therefrom.

2. A mount for photographs or pictures, comprising a stiff back, a sheet of mount-paper or the like with flaps, said sheet being held taut away from the face of said back and secured only by said flaps to said back and an insert provided with a photograph or picture and both attached to said sheet so as to be held suspended from said mount-sheet.

3. A mount for photographs or pictures, comprising a stiff back, a sheet of mount-paper or the like provided with end flaps held in required position independent of the face of said back by fastening or pasting the flaps of said sheet to said back, inserts held suspended from said mount-sheet, and a photograph or picture attached to said insert.

In testimony whereof I have hereunto set my signature in the presence of two subscribing witnesses.

JOSEPH M. ELLIOT.

Witnesses:
J. WALTER DOUGLASS,
THOMAS M. SMITH.